W. M. SCHLUER.
TOP OR HOOD FOR VEHICLES.
APPLICATION FILED MAR. 16, 1918.

1,311,717.

Patented July 29, 1919.
4 SHEETS—SHEET 1.

WITNESSES:
Fredk. W. Fraentzel
Eva C. Aesch.

INVENTOR:
William M. Schluer,
BY
Fraentzel and Richards,
ATTORNEYS.

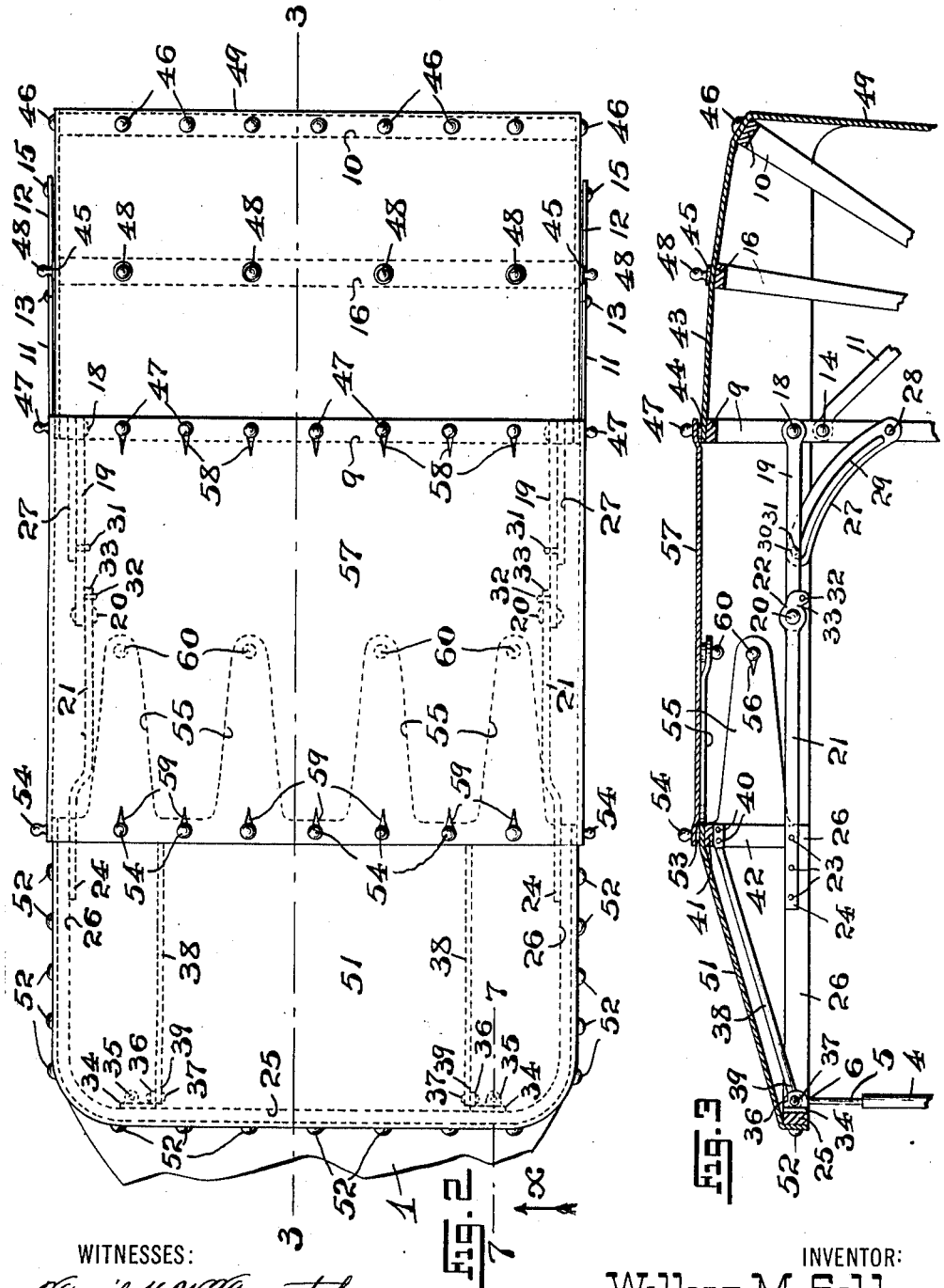

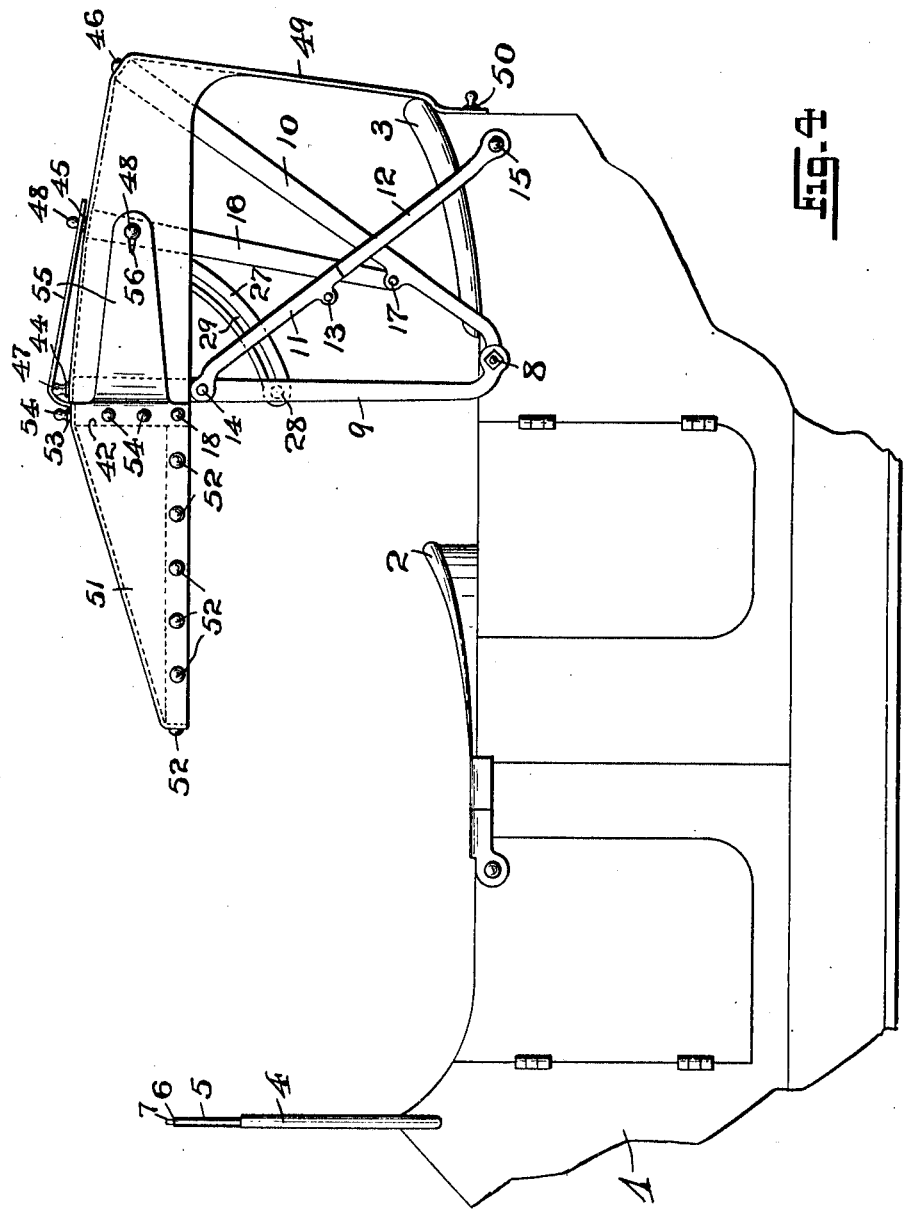

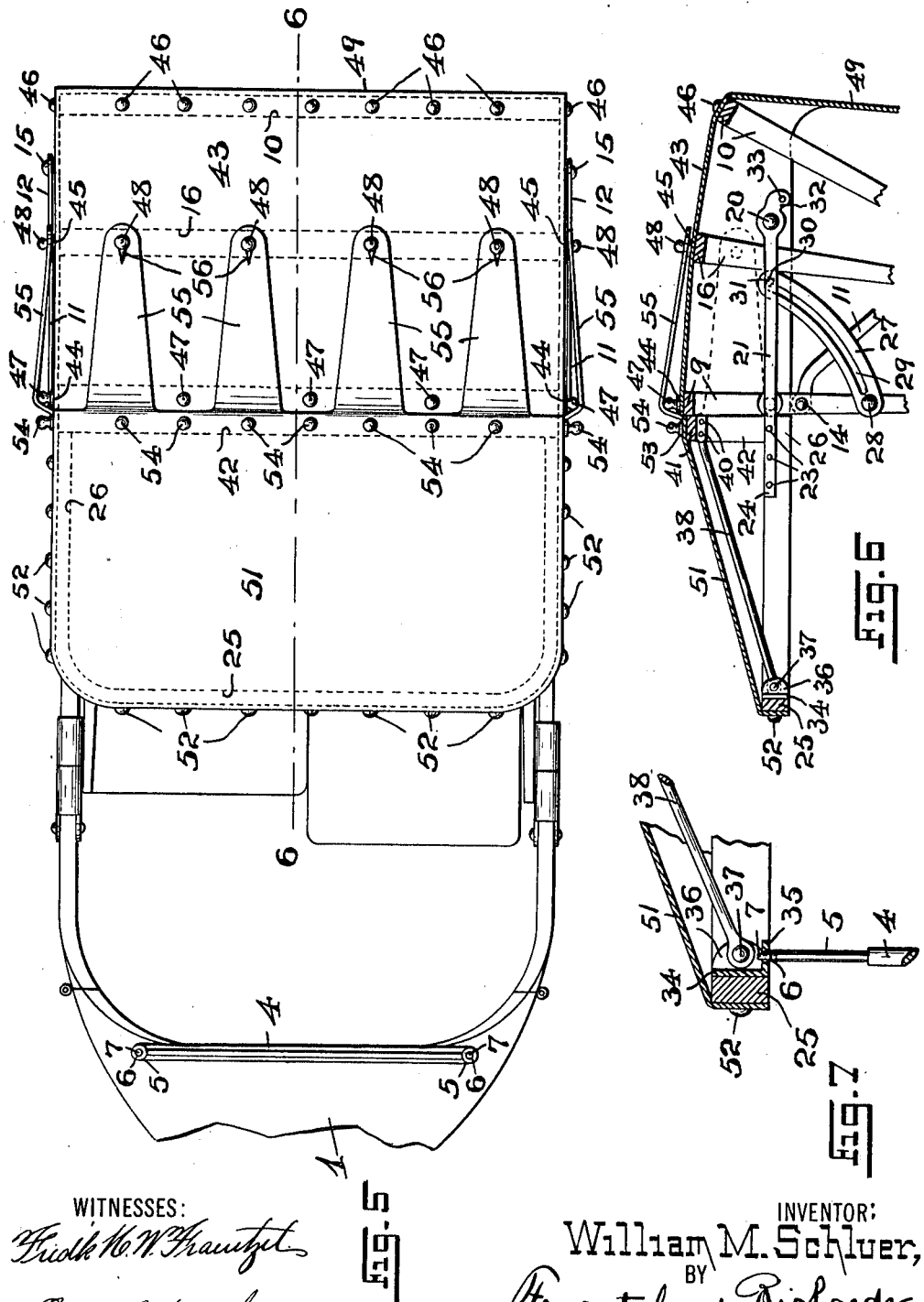

UNITED STATES PATENT OFFICE.

WILLIAM M. SCHLUER, OF ORANGE, NEW JERSEY.

TOP OR HOOD FOR VEHICLES.

1,311,717.     Specification of Letters Patent.     Patented July 29, 1919.

Application filed March 16, 1918. Serial No. 222,334.

*To all whom it may concern:*

Be it known that I, WILLIAM M. SCHLUER, a citizen of the United States, residing at Orange, in the county of Essex and State of New Jersey, have invented certain new and useful Improvements in Tops or Hoods for Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in tops or hoods for vehicles of the various kinds; and, the present invention has reference, more particularly, to a novel construction of collapsible top for automobiles, and especially to that class of automobiles which are convertible, being at times used as a roadster, and at other times as a tonneau.

The present invention, therefore, has for its principal object to provide a novel and simply constructed collapsible top or hood for vehicles and a frame-work therefor for the support or mounting of the top thereon, the top being of such construction that it may be spread above the two seats of an automobile or merely above the rear seat of the vehicle; or, the top may be used with that class of automobiles which are convertible from a roadster into a tonneau, or vice versa, from a tonneau into a roadster.

The invention has for its further object to provide in connection with a collapsible top or hood for vehicles, as automobiles, a frame-work, the various parts of which are adapted to be brought, respectively, into their fully stretched or into their folded relations, without first having to remove nuts and supporting bolts or pins, the parts having a slidable relation which permits the top-cover to occupy a minimum space above the rear seat of the vehicle, without holding or cracking the cover, and furthermore to provide a frame-work the parts of which can be moved into their opened-out relations to their full or maximum extent, so that the top or cover can be used over both seats of the automobile.

Other objects of the invention not at this time more particularly enumerated will be clearly understood from the following detailed description of the present invention.

With the various objects of the present invention in view, the said invention consists, primarily, in the novel collapsible top or hood for automobiles of the general character hereinafter set forth; and, the invention consists, furthermore, in the novel foldable supporting frame-work therefor, as well as in the novel arrangements and combinations of the several devices and parts of the same, all of which will be more fully described in the following specification, and then finally embodied in the clauses of the claim which are appended to and which form an essential part of the said specification, the said devices and parts coöperating with one another and with the top or cover to provide the results and objects hereinabove stated.

The invention is clearly illustrated in the accompanying drawings, in which:—

Fig. 2 is a top or plan view of the same; and Fig. 3 is a longitudinal vertical section of the upper portion of the said top or cover, said section being represented as taken on line 3—3 in said Fig. 2.

Fig. 4 is a side-representation of a portion of the body of the automobile, showing in connection therewith, and in side elevation, the top and cover and its frame-work in their folded relation above the rear seat of the vehicle.

Fig. 5 is a top or plan view of the devices and parts represented in said Fig. 4; and Fig. 6 is a longitudinal vertical section of the upper portion of said folded top or cover, said section being represented as being taken on line 6—6 in said Fig. 5.

Fig. 7 is a detail vertical representation, taken on line 7—7 in Fig. 2, looking in the direction of the arrow *x*.

Similar characters of reference are employed in all of the said above described views, to indicate corresponding parts.

Figure 1:
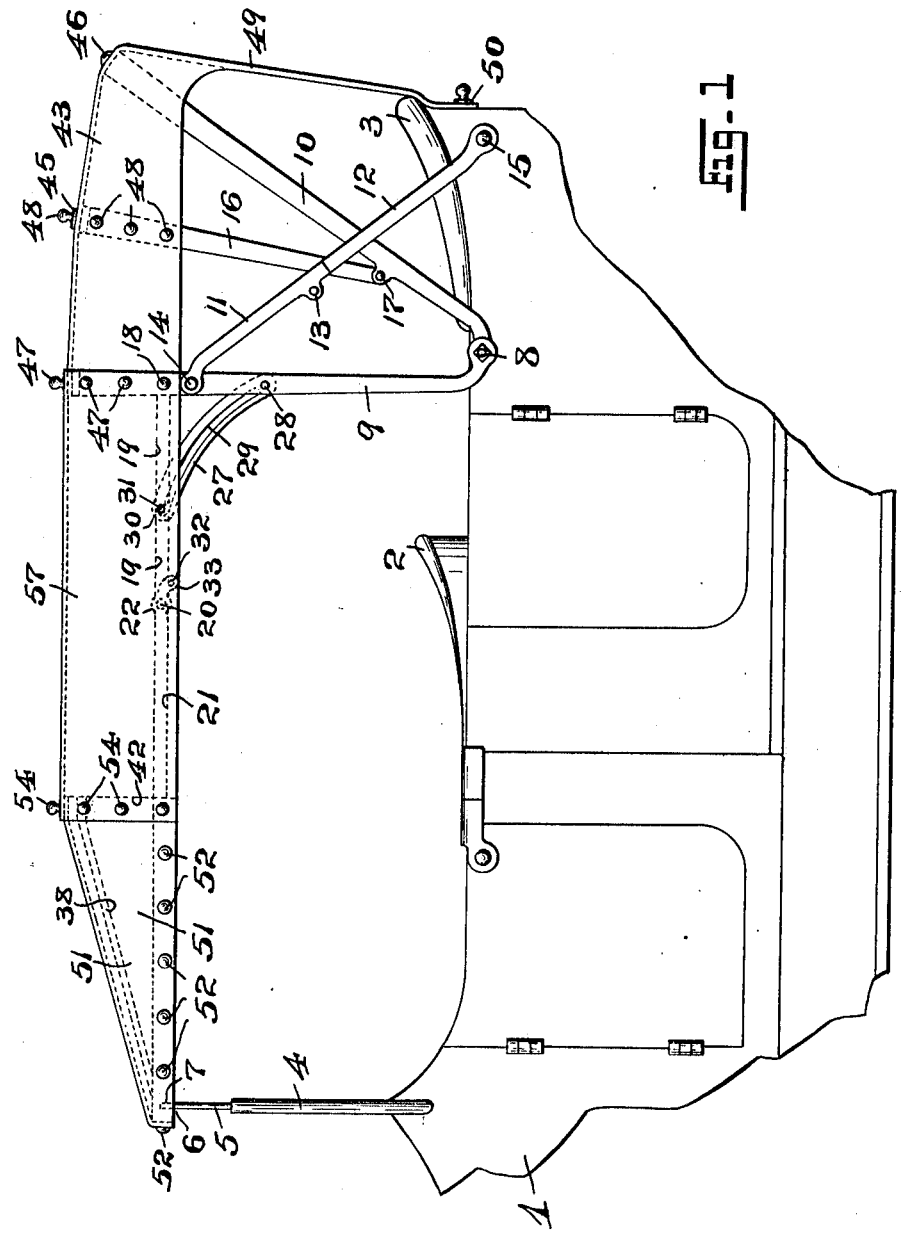
Figure 1 is a side-representation of a portion of the body of an automobile having a top or cover and frame-work therefor, illustrating one embodiment of the principles of the present invention, the said view showing the top or cover stretched above both seats of the vehicle.

Referring now to the several figures of the drawings, the reference-character 1 indicates a fragmentary portion of the body of a suitable vehicle, as an automobile, provided with front and rear seats, portions of the said seats being shown in Figs. 1 and 4 of the drawings, and being respectively indicated by the reference-characters 2 and 3. The reference-character 4 indicates the usual wind-shield, the frame thereof being provided with suitably disposed and upwardly projecting posts, as 5, preferably provided with annular off-sets 6, above which project suitably formed receiving pins or studs, as 7, for the purposes to be hereinafter more fully set forth. Pivotally mounted upon pivot-posts or studs 8 projecting laterally and outwardly from the opposite sides of the body 1, at suitable points near the rear seat, are top or hood-supporting elements or bows, as 9 and 10, the said bows 9 and 10 being maintained in their opened relations by the usual forms of collapsible braces consisting of two sets of members or bars 11 and 12 which are pivotally connected, as at 13, located upon each side of the vehicle, one set of said bars, as 11, being pivotally mounted upon pivot-posts or studs 14 extending laterally from the supporting elements or bows 9, and the other set of bars, as 12, being pivotally mounted upon pivot-posts or studs, as 15, extending laterally from the opposite sides of the body 1 of the vehicle. Another top or hood-supporting element or bow, as 16, may also be employed, said member or bar 16 having its respective end-portions pivotally connected with suitable pivot-devices or fixtures, as 17, with which the said elements or bows 10 are provided, substantially as illustrated in said Figs. 1 and 4 of the drawings.

Pivotally mounted upon suitably disposed pivot-pins or studs 18 connected with the said top or hood-supporting element or bow 9, and projecting laterally and inwardly from the opposite and vertical portions of said element or bow 9, are links, as 19, each link being pivotally connected by means of a pivot-pin or stud, as 20, to the eye-portion 22 of a fixed rod or bar 21. These rods or bars 21 are suitably affixed by means of rivets 23, or other fastening means, at their end-portions 24, to the respective end-members 26 of a front top or hood-supporting element or bow 25. To maintain each pair of said elements or members 19 and 21 in their horizontally outstretched and supported relations indicated in Figs. 1, 2 and 3 of the drawings, a pair of sectors 27 are mounted by means of pivot-pins or studs 28 upon the inner sides of the top or hood-supporting element or bow 9, said sectors having arc-shaped elongated slots, as 29, each provided with a pin or stop-receiving portion 30 for holding or retaining engagement of the said sectors with pins or studs 31 projecting from the sides of the respective links 19. Upward breaking movement of the connected end-portions of the respective links 19 and the fixed bars 21 is prevented by pins or stops, as 32, which extend laterally from the suitably-formed end-portions 33 of the said bars 21. Referring now more particularly to Figs. 1, 2 and 3 of the drawings, to prevent sagging of the top or hood-supporting frame-work, when stretched out to its full extent, it will be seen that one means for supporting the element or bow 25 consists, essentially, of a pair of plates 34 which are suitably secured upon the inner face of the said element or bow 25, each plate 34 being provided with a horizontally disposed and perforated retaining member or ear 35, adapted to be mounted over the fingers or studs 7 and rest upon the offsets 6 of the posts 5 of the wind-shield frame 4, as will be clearly understood. Other supporting means may be provided, if desired; or, the said front bow 25 may be otherwise supported with relation to the body of the vehicle, as will be clearly evident.

The said plates 34 may also be provided with other perforated ears or lugs, as 36, for the attachment to said plates 34, by means of pins 37, or other suitable fastening means of the lower end-portions 39 of suitable stay-rods or bars, as 38. These stay-rods, as will be noticed from an inspection of Figs. 3 and 6 of the drawings, extend rearwardly and upwardly, as shown, the rear end-portions of said stay-rods having secured thereto by means of rivets 40, or other suitable fastening means, the end-members 42 of another top or cover-supporting element or bow 41. The said end-members 42 have their respective ends resting upon the respective end-members 26 of the said front supporting element or bow 25, the parts being secured together in any desired and suitable manner.

Mounted upon the outer surface-portions of the top or hood-supporting elements or bows 9, 16 and 10, is a top or cover element, as 43, being permanently fastened in place by means of the nails or fastening-pins 44, 45 and 46, the pins 44 and 45 being formed with buttons or heads, as 47 and 48, the said top or cover-element 43 being also formed with the downwardly extending rear end-piece 49, fastened at its lower edge-portions to the body 1 of the vehicle by means of fastening pins, as 50, or other suitably formed fastening devices.

Mounted upon the outer surface-portions of the top-supporting elements or bows 25 and 41, is a top or cover-element, as 51, being permanently fastened in place by means of the nails or fastening-pins 52 and 53, the pins 53 being formed with buttons or heads, as 54, and the marginal edge-portion of the said top or cover-element 51 which terminates at said bow 41 being provided with fastening flaps or tongues, as 55, formed with button-holes 56.

When the various frame-members, upon which the said top or cover-elements 43 and 51 are mounted in the manner above stated, are in the positions indicated in Figs. 1, 2 and 3 of the drawings, the open space between the said elements 43 and 51 may be closed by a detachable top or cover-section 57 of the proper length, said top or cover-section being provided with suitably disposed button-holes 58 and 59 for removably attaching or securing it to the buttons or heads 47 and 54. As shown, the said top or cover-section 57 may have extending from its under surface suitably disposed buttons, as 60, or other means, for fastening the ends of the tabs or tongues 55 thereto, substantially as shown in Figs. 2 and 3 of the drawings, so as to secure said tabs or tongues out of the way of the persons seated in the vehicle.

From the foregoing description and from an inspection of said Figs. 1, 2 and 3 of the drawings, it will be clearly seen, that the top or hood is in its fully outstretched relation over both seats of the vehicle.

When it is desired to use the top or hood merely with the last seat, the tabs or tongues 55 are detached from the buttons 60, and the top or hood-section 57 is likewise detached from the buttons 47 and 54. Then by the proper manipulation of the sector-elements 27 and the links 19, the perforated lugs or ears 35 having been previously lifted from the fingers or studs 7, the frame-portions are readily moved into the positions indicated in Figs. 4 and 6 of the drawings, with the bow 41 being brought directly against the bow 9, and the frame-members being held against movement by the sector-elements 27 and the pins or studs 30, as will be clearly understood from an inspection of said Fig. 6. To properly close the joint between the adjacent bows 41 and 9, the tabs or tongues 55 of the top or cover-element 51 are disposed upon the outer surface of the top or cover-element 43 and attached to the buttons or heads 48, as shown in said Figs. 4, 5 and 6.

Thus it will be clearly seen that I have thereby provided a canopy or top extending merely over the rear seat of the vehicle.

While in the foregoing I have described and illustrated the top or cover and its frame-work as applied to a two-seated vehicle, it will also be evident that this style and construction of top or hood is also readily adapted for use with that class of automobiles where the vehicle is interchangeable from a run-about to a tonneau, of vice versa from a tonneau to a run-about.

Of course I am aware that some changes may be made in the general arrangements and combinations of the various devices and parts, as well as in the details of the construction of the said parts, without departing from the scope of the present invention as set forth in the foregoing specification, and as defined in the clauses of the claim which are appended thereto. Hence, I do not limit my invention to the exact arrangements and combinations of the devices and parts as described in the said specification, nor do I confine myself to the exact details of the construction of the said parts as illustrated in the accompanying drawings.

I claim:—

1. A top or hood for vehicles, comprising a collapsible supporting frame-work, top or cover elements mounted respectively upon the rear portion and the front portion of said frame-work, and an interdisposed cover-section adapted to be detachably mounted upon said frame-work, whereby the top or hood may be used as a cover above the front and rear seats of the vehicle when said cover-section is attached, and may be used merely over a single seat when said cover-section is detached, an attaching means connected with one of said top or cover-elements, independent of the means to which said interdisposed cover-section is to be attached, and means connected with and extending from the lower surface-portion of said detachable cover-section to which said attaching means is adapted to be attached.

2. A top or hood for vehicles, comprising a collapsible supporting frame-work, top or cover elements mounted respectively upon the rear portion and the front portion of said frame-work, and an interdisposed cover-section adapted to be detachably mounted upon said frame-work, whereby the top or hood may be used as a cover above the front and rear seats of the vehicle when said cover-section is attached, and may be used merely over a single seat when said cover-section is detached, an attaching means connected with one of said top or cover-elements, independent of the means to which said interdisposed cover-section is to be attached, means connected with and extending from the lower surface-portion of said detachable cover-section to which said attaching means is adapted to be attached, and means connected with said frame-work for retaining said frame-work in either its extended or collapsed relation.

3. A top or hood for vehicles, comprising a collapsible supporting frame-work, top or cover elements mounted respectively upon the rear portion and the front portion of said frame-work, and an interdisposed cover-section adapted to be detachably mounted upon said frame-work, whereby the top or hood may be used as a cover above the front and rear seats of the vehicle when said cover-section is attached, and may be used merely over a single seat when said cover-section is detached, tabs extending from one of said top or cover-elements, means connected with the other top or cover-element, independent of the means to which said interdisposed cover-section is adapted to be attached, and means connected with said detachable cover-section to either of which the said tabs may be attached.

4. A top or hood for vehicles, comprising a collapsible supporting frame-work, top or cover elements mounted respectively upon the rear portion and the front portion of said frame-work, and an interdisposed cover-section adapted to be detachably mounted upon said frame-work, whereby the top or hood may be used as a cover above the front and rear seats of the vehicle when said cover-section is attached, and may be used merely over a single seat when said cover-section is detached, and means connected with said frame-work for retaining said frame-work in either its extended or collapsed relation, tabs extending from one of said top or cover-elements, means connected with the other top or cover-element, independent of the means to which said interdisposed cover-section is adapted to be attached, and means connected with said detachable cover-section to either of which the said tabs may be attached.

5. A top or hood for vehicles comprising a series of pivoted and collapsible top or hood-supporting bows, a top or cover-element secured upon said bows, forwardly extending links pivotally connected with one of said supporting bows, sector-elements also pivotally connected with said last-mentioned supporting bow, said sector-elements being slidably connected with said links, rods pivotally connected with the said links, and means connected with said rods for maintaining a fixed horizontal relation of said rods and link, top or hood-supporting bows connected with the free end-portions of said rods, a top or cover-element secured upon said last-mentioned bows, and an interdisposed cover-section adapted to be detachably mounted upon some of said bows with relation to said top or cover-elements, whereby the top or hood may be used as a cover above the front and rear seats of the vehicle when said cover-section is attached, and may be used merely over a single seat when said cover-section is detached.

6. A top or hood for vehicles comprising a series of pivoted and collapsible top or hood supporting bows, a top or cover-element secured upon said bows, forwardly extending links pivotally connected with one of said supporting bows, sector-elements also pivotally connected with said last-mentioned supporting bow, said sector-elements being slidably connected with said links, rods pivotally connected with the said links, and means connected with said rods for maintaining a fixed horizontal relation of said rods and link, top or hood-supporting bows connected with the free end-portions of said rods, a top or cover-element secured upon said last-mentioned bows, and an interdisposed cover-section adapted to be detachably mounted upon some of said bows with relation to said top or cover-elements, whereby the top or hood may be used as a cover above the front and rear seats of the vehicle when said cover-section is attached, and may be used merely over a single seat when said cover-section is detached, tabs extending from one of said top or cover-elements, means connected with the other top or cover-element, and means connected with said detachable cover-section to either of which the said tabs may be attached.

In testimony, that I claim the invention set forth above I have hereunto set my hand this 11th day of March, 1918.

WILLIAM M. SCHLUER.

Witnesses:
    FREDK. C. FRAENTZEL,
    FREDK. H. W. FRAENTZEL.

Copies of this patent may be obtained for five cents each, by addressing the "Commissioner of Patents, Washington, D. C."